TEMPERATURE DISTRIBUTION
WITHIN THE POROUS MEDIA

INVENTOR.
BERNARD S. BAKER
& DIMITRI GIDASPOW
BY Bair, Freeman &
Molinare
ATTORNEYS INVENTOR.
BERNARD S. BAKER
& DIMITRI GIDASPOW
BY Bair, Freeman &
Molinare ATTORNEYS

United States Patent Office 3,523,830
Patented Aug. 11, 1970

3,523,830
FUEL CELL AND METHOD OF CONTROLLING THE TEMPERATURE OF SAID CELL
Bernard S. Baker and Dimitri Gidaspow, Chicago, Ill., assignors to Institute of Gas Technology
Filed Sept. 26, 1966, Ser. No. 581,845
Int. Cl. H01m 27/00
U.S. Cl. 136—86
17 Claims

ABSTRACT OF THE DISCLOSURE

Method and apparatus utilizing the flow of relatively cold input gas, whether oxidant, e.g. air, or the gas to be oxidized, e.g. the fossil fuels, "counter-current" to the heat flow from the operating fuel cell, e.g. as through a porous media adjacent and in thermal contact with the fuel cell, as a heat-sink to moderate the heat generated in the cell, thereby preventing overheating and permitting the maximum power output of the cell to be realized. The heat transfer to the relatively cold gas as it passes counter-currently to the heat flow through a porous media is termed "transpiration heating," and provides the equivalent of a simply controllable, variable thickness insulation. The amount of the input gas transpiration heated may be controlled in response to internal temperature conditions of the cell, electrical output, or in response to predetermined load conditions.

---

This invention is directed to novel fuel cells and methods of controlling the operating temperatures thereof by what we term transpiration heating of the input gases whereby the full power potential of fuel cells may be realized, and their efficiency of operation increased.

It is well known that a fuel cell is an electrochemical device in which the chemical energy of a conventional fuel is converted directly and usefully into low-voltage direct current electrical energy. For present purposes, conventional fuels are the fossil fuels, including the naturally occurring gaseous hydrocarbons, or substances easily derived therefrom. Hydrogen qualifies if it is not so pure as to be prohibitive in cost; carbon monoxide which can be made from coal as water gas containing hydrogen, or as producer gas by the reaction of carbon dioxide, also qualifies. Under the present definition, oxygen or air is the only oxidant.

Although fuel cells are highly efficient because they are not Carnot devices, heat is produced in the irreversible electrochemical oxidation reaction that liberates electrons for power uses. In prior art fuel cells, it is difficult, from a practical and structural standpoint, to remove the heat generated by the cell, particularly where there is no readily circulated electrolyte. Matrix, molten salt or carbonate, and solid oxide type cells, as well as those that operate at such high temperatures that no cooling liquid can be circulated, are exemplary of such prior art cells.

Additional problems arising in the removal of heat from such prior art cells arise from the fact that there are temperatures below which the operation of the cells is inefficient or a part thereof becomes inactive. For example, in molten salt fuel cells it is desirable to maintain the cell walls at about 1200° F. for satisfactory operation. If the wall temperature falls below that value, a portion of the cell is rendered inactive. To prevent such an occurrence, insulation is provided around the electrode-electrolyte bank in the cell.

However, a serious limitation arises from the use of the insulation and because the cells are so designed as to operate at a given power output. The insulation thickness must be chosen so that a satisfactory temperature distribution can be maintained, e.g. so as not to fall below 1200° F. as in the molten salt cell discussed above. However, if a cell so insulated is required to deliver a higher power output due to a variation in the load, there is a danger of overheating since an increase in production of electricity is accompanied by a corresponding increase in the heat generation. Thus, in the case of the molten salt fuel cell, if the temperature rises significantly above 1200° F., the cell will be damaged due to the overheating.

We have observed that for such insulated fuel cells the temperature distribution and hence temperature of the hot side is a function of four parameters—the heat generation rate, the convection coefficient, the thermal conductivity of the insulation and the thickness of insulation. For a given insulated fuel cell all the parameters but the heat generation and flow rate are fixed. Hence, there is no possibility of avoiding higher temperatures when the internal heat generation increases in response to increased load or fuel consumption.

It is clear that such insulation provided to insure activity in all portions of the cell is a hindrance to operation at higher power output. Hence, the full power potential of the prior art fuel cells cannot be realized because of the above described thermal limitations.

Additionally, there is in the prior art no means by which the insulation thickness may be varied to provide a single cell available for both high efficiency (lower temperature) operation and high power output (higher temperature) operation under conditions of varying loads. Rather, individual cells, each having different parameters for insulation thickness, fuel consumption, operational temperature, power output and efficiency must be built. If the fuel cell is designed for constant load, either operating cost or investment cost must be sacrificed. For example, if a fuel cell is designed to operate at an average cell voltage of 0.8 volt, a higher efficiency (lesser operating costs) is achieved than where a unit is designed to operate at 0.6 volt. However, a larger unit (greater investment cost) is required for the 0.8 volt cell which produces less power per unit volume of cell than the 0.6 volt system.

It is an object of this invention to provide a fuel cell, and method of regulating its operation, that will operate over a wide variety of load conditions to deliver maximum power when power is sought and high efficiency when efficiency is sought.

It is another object of this invention to provide such a cell and regulatory method that is simple in structure, cheap and practicable to build, and simple and reliable in operation.

It is a further object of this invention to provide such a cell and regulatory method that permits continuous control throughout the entire operating range in response to varying load conditions, or which may be preset for a particular predetermined load pattern.

It is a still further object of this invention to provide a means to reduce the total heat loss from the entire system in a controlled fashion and hence raise its efficiency.

It is still another object of this invention to provide a fuel cell and regulatory method that is responsive to any of the fuel cell parameters such as but not limited to internal temperature, power or current output, fuel consumption, load, or to a predetermined operational cycle.

Further objects will be evident in the detailed discussion and the non-limiting illustrative examples that follow.

We have discovered a structure and mode of regulating the operation of a fuel cell that permits the attainment of the above named objectives, inter alia, the predetermined setting and continuous control of fuel cell temperature with the realization of maximum efficiency or power output in a fuel cell system of a single design that is both simple of structure and operation and that runs no danger of overheating, and in which the conventional prior art input gas heat exchanger may be eliminated.

More specifically, we have discovered that the flow of relatively cold input gas, whether oxidant, e.g. air, or the gas to be oxidized, e.g. the fossil fuels, "counter-current" to the heat flow of the hot operating fuel cell, e.g. as through a porous media adjacent and in thermal contact with the fuel cell, may be utilized as a heat-sink to moderate the heat generated in the cell, thereby preventing overheating and permitting the maximum power output of the cell to be realized. In addition, the utilization of the input gases as a counter-flowing heat-sink permits the elimination of prior art heat exchangers wherein the input gases were pre-heated to a temperature sufficiently high to prevent quenching or inactivation of a portion of the cell.

We term the heat transfer to the relatively cold gas as it passes "counter-currently" to the heat flow, as through a porous media, "transpiration heating," and the phenomena shall be referred to as such throughout this specification.

While either or both the oxidant or fuel gas may act as the counter-flowing heat-sink, it is preferred to use the oxidant, e.g. air. Air is preferred since the input necessary to moderate and control the temperature is less than the consumption at the fuel cell electrode, the cathode in the case of air. Since air is freely available there is no economic or supply problem involved in its use, whereas with the fuel gas, the amount needed for heat-sink purposes in excess of that consumed as fuel present potential economic loss and a supply problem. However, this does not mean that our invention is limited to the use of the air oxidant as the heat-sink gas. Alternatively, where fuel gas is employed as the heat-sink gas, the excess heated gas leaving the anode may be recirculated to the input, optionally passing through a heat exchanger to cool it for more efficient use. Likewise, the excess gas from one cell, after optionally passing through a heat exchanger, may be routed to the input side of a second cell, in series with the first.

Figure 1:
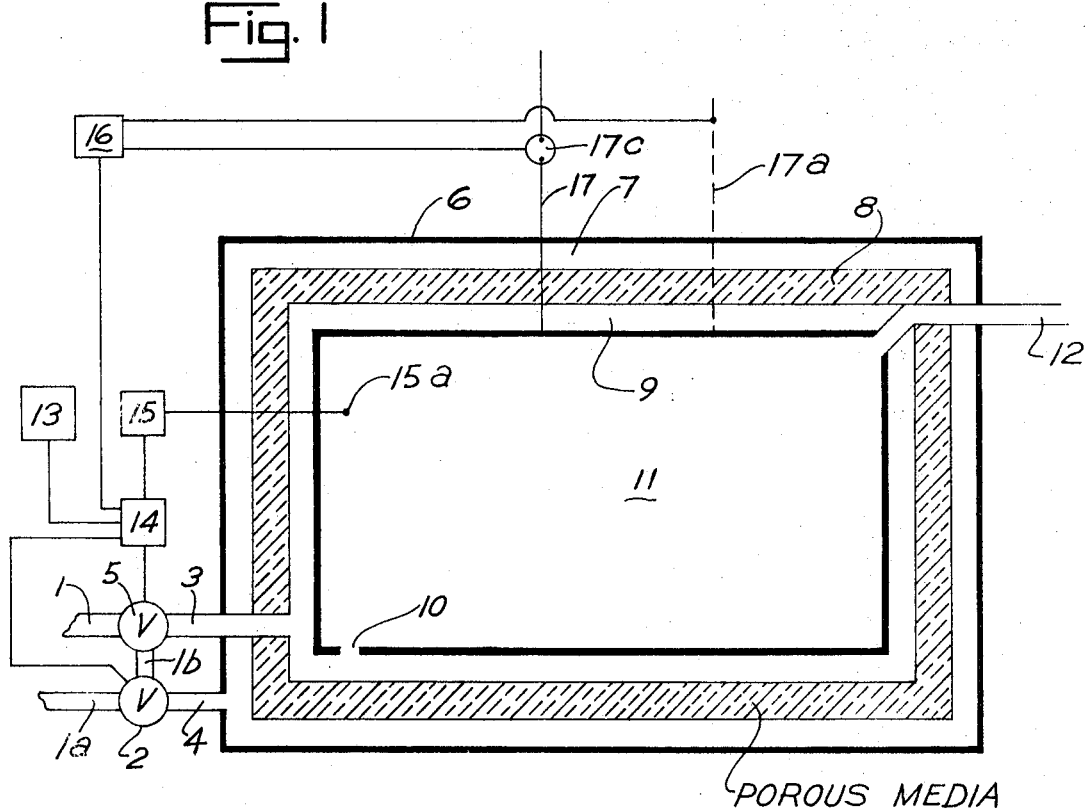
FIG. 1 depicts a schematic diagram of the fuel cell of the present invention, taken as a sectional view at one of the electrode plates, particularly the cathode where air is the oxidant input gas.

With reference to FIG. 1, input gas, e.g. air, is fed into line 1 or 1a of the fuel cell system by means of a blower or compressor. The air flows either through line 3 or 4 or through both lines.

Control means for regulating introduction of input gas, for example, oxidant, into the cell are comprised of suitable valves 2 and 5, or a single proportioning valve (not shown). The valves are actuated by control 14 in response to internal temperature or electrical conditions of the cell, which conditions are sensed by control devices 15 and 16, which for example may include conventional instrumentation for temperature, as the thermocouple 15, 15a, and for current, power or voltage, as sensor 16 for determining power or voltage output from electrical output wires 17 and 17a, or current sensing device 17c. Alternatively, the valve or valves may be controlled by programming means 13 responsive to predetermined load conditions. Taking now the example where a single input gas such as air oxidant is fed into line 1, when valve 5 is closed and valve 2 is open, all the air will flow through line 4 past the sealed casing 6 into cavity 7. From cavity 7 the gas is transpired through a porous insulation media 8, such as porous refractory brick for use at high temperatures, into inner cavity 9 and then into fuel cell 11 via entrance port 10. Unreacted air exits through exit port and line 12. The alternate path for the gas is to flow through line 3 when valve 5 is open. In practice a portion of an input gas will be fed through line 3 and a portion through line 4 by proportionate opening of valves 2 and 5, as required to maintain the fuel cell wall temperature constant at the desired value. The regulation or control valves 2 and 5 may be connected to a preset program, or tuned to the power output from the fuel cell, or tuned to a temperature sensor within the fuel cell unit for temperature control purposes.

It will be appreciated, with reference to the discussion of the utilization of the heated excess gas exiting through line 12, that the heated excess gas may be routed directly to the input line 1, 3 of a second fuel cell through control valve 5 without passing through a heat exchanger. In this construction, relatively cool ambient air would be provided through input line 1a, 4 of the second cell, the bypass line section 1b being closed off at valves 2 and 5. Thus, all the air eventually reaching the cathode is of substantially the same temperature, the line 1, 3 air being preheated and the line 1a, 4 air being heated by transpiration. Thus, the opportunity for quenching or inactivation by cold air from line 1, 3 where such air is not preheated is lessened. As a further alternative, the heated excess exhaust from line 12, rather than being recycled directly into line 1, 3 of the same cell or routed to the corresponding tube of a second cell, may act as the heat source for a preheater heat-exchanger for line 1, 3 input gas.

Thus, by control of the relative rates of the gas flow through lines 3 and 4 depicted in FIG. 1, the temperature of the cell interior can be effectively controlled. The control valves 2 and 5 may be operated in response to a predetermined program corresponding, for example, to anticipated or desired power output, or directly in response to the interior hot wall temperature by means of a standard temperature sensing device, e.g. a thermocouple, or to the actual power or current output by suitable conventional feed-back control circuitry. It is to be appreciated that the porous insulation in the present invention is so placed, e.g. by spacing from the exterior wall, that it serves a plurality of functions, an insulating medium, a heat exchanger, and as a transpiration means, the latter providing an effective "variable" insulation media. The plurality of functions served thereby and omission of additional heat exchangers permits optimal use of fuel cell hardware, and reduction in the electrode-electrolyte bank size.

In prior art devices, the gas input is direct, through a line such as line 3 in FIG. 1, and there is no dual or alternate input line 1a, 4. Thus, no transpiration heating can occur in such prior art cells since any gas that flows through line 3 does not participate in the transpiration effect. Additionally, in such prior art devices, a heat exchanger (not shown) through which the input gas passes before entering line 3 must be provided to prevent quenching or inactivation. In the fuel cell of the present invention such heat exchangers may be entirely eliminated. Further, in the prior art devices the insulation 8 serves a single function, as insulation, to confine heat within the cell and to prevent the temperature from falling below the minimum operating temperature. Heat flows through the insulation only by conduction. The insulation, being of given thickness, is a fixed parameter and there is thus no means to regulate temperature for varying load conditions.

In the case of the present invention wherein gas flows "counter-current" to the heat flow through the porous insulation media, we have discovered that the temperature distribution is a function not only of the above mentioned four parameters—heat generation rate, convection coefficient, thermal conductivity of the insulation, and thickness of the insulation—but additionally involves fifth and sixth parameters—the heat capacity of the gas and the gas flow rate. In the gas transpiration case of the present invention, we have discovered that the gas flow rate can be adjusted to compensate for the increased heat generation. The dependence of the cell interior hot wall temperature on gas flow is complex but we have discovered it to be given approximately by Equation 1:

$$T_w = T_o + \frac{q}{GC_p}\left(1 - \frac{h}{h+GC_p} \exp\left[-\frac{GC_p L}{k}\right]\right) \quad (1)$$

where $T_w$ = wall temperature,
$T_o$ = ambient temperature,
$q$ = heat generation rate per unit fuel cell area,
$G$ = mass gas flow rate per unit porous insulation media area,
$L$ = porous insulation media thickness,
$k$ = porous insulation media thermal conductivity,
$C_p$ = heat capacity of input gas,
$h$ = overall heat transfer coefficient on the ambient side.

Figure 2:
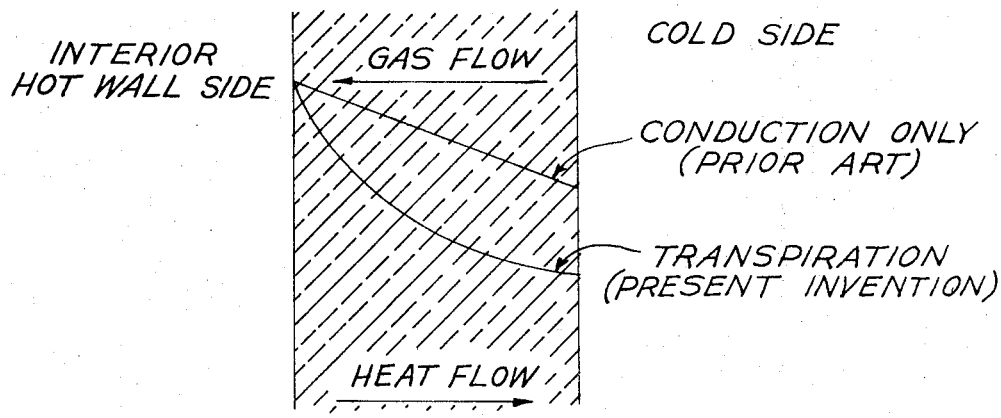
FIG. 2 depicts the wall temperature functions for cells or both the prior art and the present invention.

In FIG. 2 the straight line shows the usual temperature distribution through the porous insulation. The curve indicates the temperature distribution of the transpiration heating of the present invention. The transpired gas picks up the heat which would normally flow out of the system by conduction. This minimizes the heat loss from the system thus increasing the efficiency of the process since the hot gases produced are needed for fuel cell operation.

It should be noted that the use of transpiration as an effective temperature regulation mechanism is only possible if gas transpiration rates which affect the temperature distribution are compatible with the operation of the fuel cell. In other words, were it necessary to transpire at gas flow rates significantly greater than the consumption rate in the fuel cell, then the transpiration mechanism of regulation would have little, if any, utility. Since the heat generation is due to the conversion of the gases flowing into the cell it seemed evident that a high gas flow rate to effect temperature control by transpiration would be necessary. Surprisingly, we have discovered the opposite is in fact the case. The amount of gas required to effectively regulate the temperature of the cell is equal to or less than the gas rates normally supplied to the fuel cell system. This is readily seen by comparing Table 1 with FIGS. 3 and 4.

TABLE 1

| | Air flow rate, lb./hr.-ft.² | | |
| --- | --- | --- | --- |
| | Conversion in fuel cell | | |
| Voltage, V | 10% | 50% | 100% |
| .8 | 8.3 | 1.66 | .83 |
| .6 | 11.1 | 2.2 | 1.1 |

Figure 3:
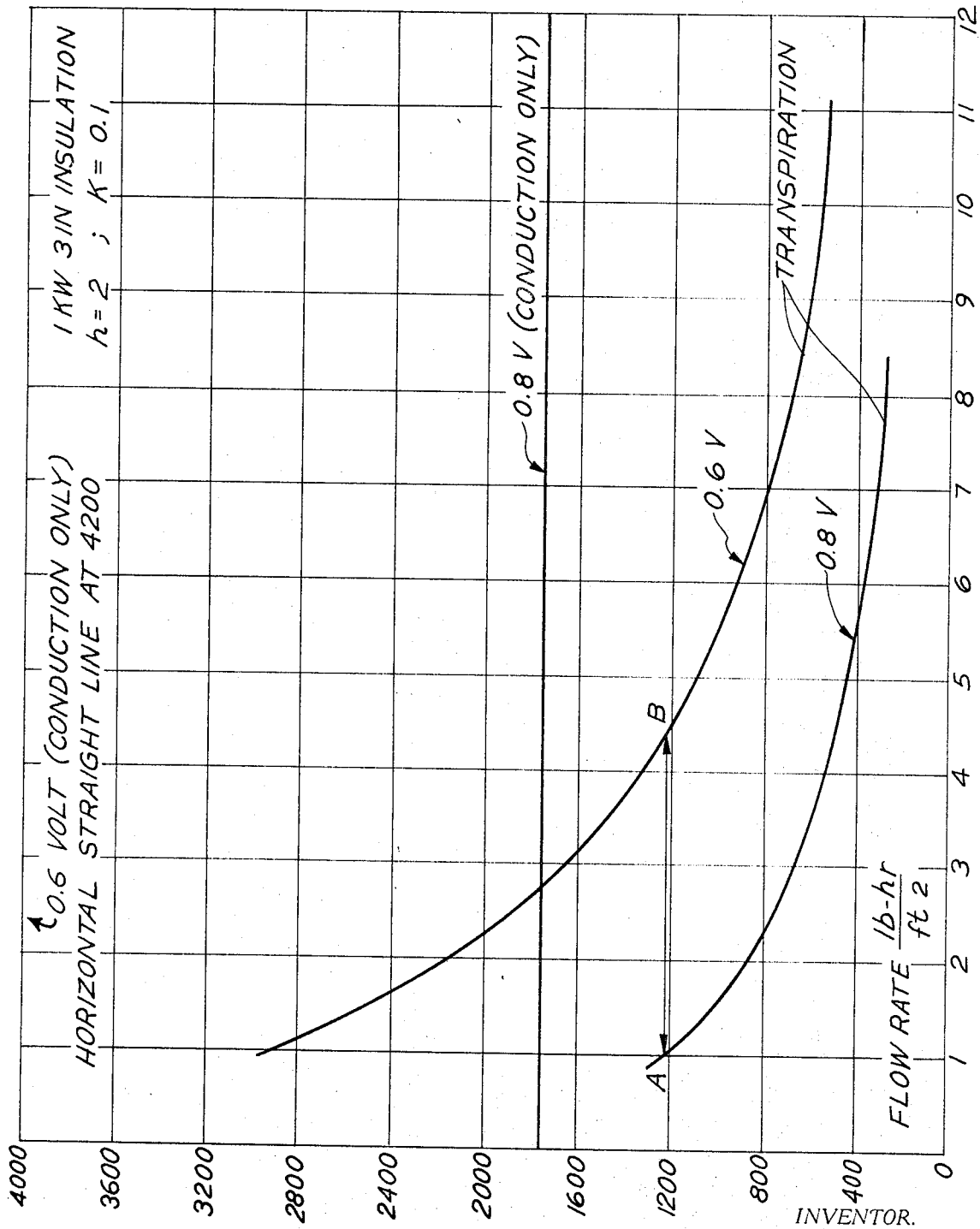
FIG. 3 is a graph of differential temperatures, $T_w-T_o$, where $T_w$ is the interior hot wall temperature and $T_o$ is the inlet temperature, plotted against the transpiration rate per unit area of insulation for a given insulation thickness. The graph also depicts the straight line prior art values.

In FIG. 3, two curves and two straight lines are indicated for the case of 3 inches of insulation around a 1 kw. fuel cell. The straight lines represent the wall temperature function ($T_w-T_o$) for the case of conduction only. Hence, in this case there is no change in $T_w-T_o$ with varying gas flow rate. The two lines represent the temperature at cell operating voltages of 0.6 and 0.8 volt as indicated. In the case of transpiration heating two curved lines are obtained in accordance with Equation 1. Here the temperature of the wall is a function of the gas flow rate, e.g. gas transpired through the insulation.

Figure 4:
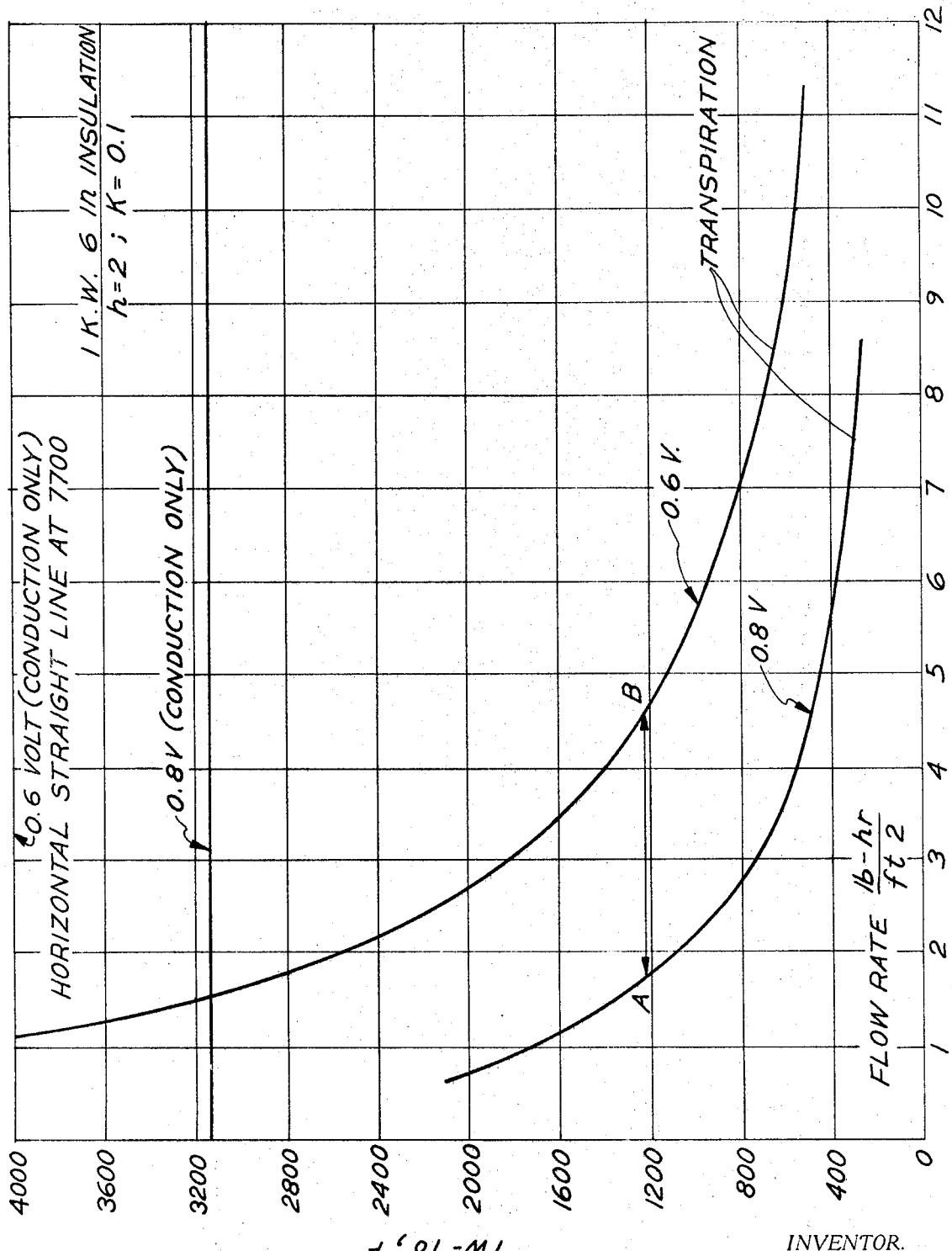
FIG. 4 is a graph corresponding to that of FIG. 3 for a different insulation thickness.

Hence, with transpiration it is possible to select a flow rate for any given insulation thickness (3 in. in this example) for which the desired wall temperature is achieved. If a greater power demand is made on the cell the wall temperature can be maintained constant by increasing the flow rate along line A–B as shown in FIG. 3. Thus the use of transpiration provides both a means of temperature regulation as well as a means of optimizing fuel cell operation. A second example, for the same system with 6 inches of insulation is shown in FIG. 4. Again the line A–B represents the increase in gas flow rate necessary to compensate the temperature for the extra heat load.

It will be appreciated, also, that one gas may be used as the heat-sink gas, e.g. the fuel gas, and the other gas, e.g. the oxidant, may be directed into the cell in the conventional manner. By so doing, the need for an excess flow of a single gas is lessened or entirely eliminated. It is evident that the choice of which gas, oxidant or fuel, is used as the heat-sink gas depends on the heat capacity of the particular gas and the total heat needed to be eliminated from the system, and the relation between gas consumption rates and their thermal characteristics. From those parameters the rate of flow for cooling the fuel cell may be estimated. Where the resultant rate of flow is still in excess of that needed for the reaction at the electrode, air will be preferred as the heat-sink gas for the economic and supply reasons given above, but in the converse case the fuel gas could serve in part or in total as the heat-sink gas, the increase in amount to be diverted through the porous media being in proportion to the increase in interior temperature as showen approximately by Equation 1.

Having described our invention, those skilled in the art will recognize that various modifications may be made thereto within the skill of the art and we intend our invention to be limited solely by the following claims.

We claim:
1. A fuel cell comprising:
   (1) an outer housing,
   (2) an electrode-electrolyte bank within said housing,
   (3) porous insulation media disposed within said outer housing,
     said media being spaced from said bank and said housing to define a first and a second cavity therebetween,
     said second cavity communicating with an electrode of said bank,
   (4) a first conduit communicating with said first cavity,
   (5) a second conduit communicating with said second cavity,
   (6) means for regulating flow of input gas to said first cavity and said second cavity respectively,
     whereby said input gas cooperating with said porous insulation provides for transpiration such that an effective variable insulation thickness is provided to compensate for changes in heat output of said fuel cell operating under varying load conditions, and
   (7) means for removing exhaust product from said bank.

2. A fuel cell as in claim 1 wherein said regulating means is responsive to internal temperature conditions within said bank.

3. A fuel cell as in claim 1 wherein said regulating means is responsive to the electrical output of the cell.

4. A fuel cell as in claim 1 wherein said regulating means includes a valve in each of said first and said second conduits for controlling flow input gas to said first and said second cavity.

5. A fuel cell as in claim 1 wherein said regulating means includes means responsive to predetermined load conditions.

6. A method of controlling the operating temperature of a fuel cell wherein input reactant gases are converted to electrical energy comprising the steps of:
   (1) transpiration heating a portion of an input gas, said transpiration heating including passing said portion through a porous medium counter-current to the flow of heat passing from the interior of said cell through said medium,
   (2) contacting a fuel cell electrode with said transpiration heated gas, and
   (3) removing exhaust products from said electrode, whereby the effective thickness of the porous insulation media may be continuously varied to control the internal temperature of said cell and to permit efficient power output of said cell under variable load conditions.

7. A method as in claim 6 which includes the added step of regulating the proportion of said input gas to be transpiration heated in response to operating conditions of said fuel cell.

8. The method of claim 7 in which the proportion of input gas is regulated in response to operating temperature conditions.

9. The method of claim 8 in which said step of transpiration heating an input gas consists in passing a portion of input oxidant through said porous medium.

10. In a fuel cell in which input reactant gases are converted to electrical energy comprising:
   (A) an outer housing,
   (B) an electrode-electrolyte assembly disposed within, said housing including:
      (i) a cathode
      (ii) an anode
      (iii) electrolyte disposed between said cathode and said anode, and
      (iv) a passage defined adjacent each of said anode and said cathode to provide access thereby by reactant gases, and
   (C) means for exhausting reaction product gas from said passage, the improvement in combination with said housing, assembly, and exhaust means, which comprises:
      (1) porous media disposed between said assembly and said housing,
         (i) said media being spaced from a portion of said housing to define a cavity space therebetween,
         (ii) said media being adapted to permit flow of input reactant gas from said cavity space into said passage, and
      (2) means for passing input reactant gas into said cavity space, whereby a portion of said input gas flows through said porous media counter-current to reaction heat flow in said porous media and is transpiration heated thereby.

11. A fuel cell as in claim 10 which includes in combination with said means for passing input reactant gas into said cavity space,
      (3) means for regulating the flow of input gas to said passage and to said cavity respectively.

12. A fuel cell as in claim 10 which includes:
   (D) means for passing input reactant gas directly into at least one of said passages defined adjacent said anode and said cathode.

13. A fuel cell as in claim 11 wherein said regulating means is responsive to internal temperature conditions within said assembly.

14. A fuel cell as in claim 11 wherein said regulating means is responsive to the electrical output of the cell.

15. A fuel cell as in claim 11 wherein said regulating means is responsive to predetermined load conditions.

16. A method of operating a fuel cell wherein input reactant gases are converted to electrical energy comprising the steps of:
   (1) passing a portion of a first input reactant gas into contact with a first electrode,
   (2) passing a portion of a second reactant gas into contact with a second electrode,
   (3) passing a portion of one of said reactant gases through a porous media adjacent said cell in counter-current relation to heat flow therethrough to effect transpiration heating of said portion,
   (4) directing said transpiration heated gas into contact with an electrode in said bank, and
   (5) removing exhaust gas from said bank, whereby the effective thickness of said porous insulation media may be continuously varied to control the internal temperature of said cell operating under variable load conditions, the total heat loss of said cell is decreased, and the full power potential of said cell may be realized.

17. In a method of operating a fuel cell which includes converting into electrical energy the chemical energy of an input reactant gas passing into contact with an electrode of an electrode-electrolyte bank, and removing exhaust gas from said bank, the improvement which comprises the added steps of:
   (a) transpiration heating a portion of said input reactant gas by passing said gas through porous media adjacent said electrode counter-current to heat flow in said media, and
   (b) passing said heated portion to said electrode to be utilized as a reactant, whereby the effective thickness of said porous media may be continuously varied to control the internal temperature of said cell operating under varying load conditions, the total heat loss of said cell is decreased, and the power potential or efficiency is increased.

References Cited

UNITED STATES PATENTS

| | | | |
|---|---|---|---|
| 2,980,749 | 4/1961 | Broers | 136—86 |
| 3,198,503 | 8/1965 | Eichelberg et al. | 266—5 |
| 3,377,203 | 4/1968 | Mobius et al. | 136—86 |

WINSTON. A. DOUGLAS, Primary Examiner

H. A. FEELEY, Assistant Examiner